Jan. 24, 1950     L. W. MUELLER     2,495,595
METER STOP
Filed June 11, 1945
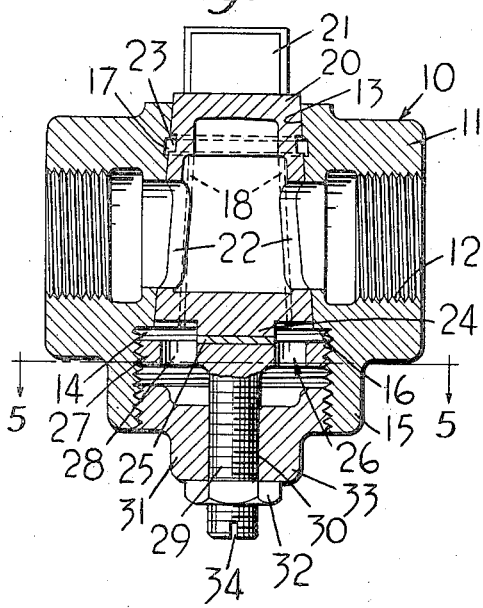
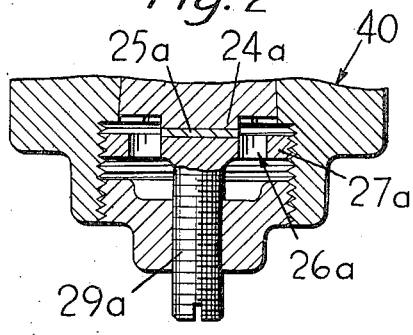
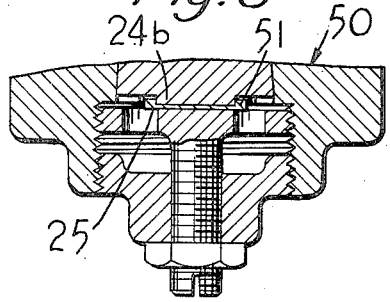
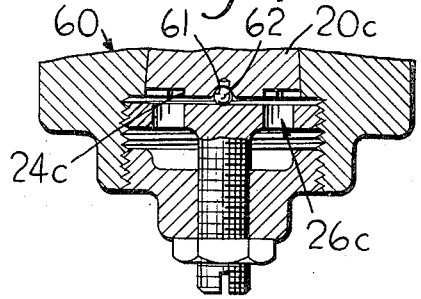
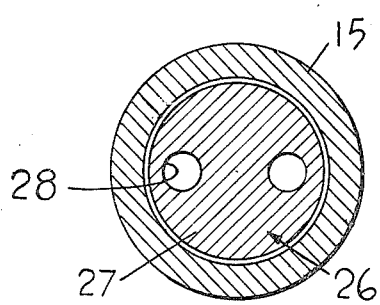
Inventor
Lucien W. Mueller
By Cushman, Darby & Cushman
Attorneys Patented Jan. 24, 1950

2,495,595

UNITED STATES PATENT OFFICE 2,495,595

METER STOP

Lucien W. Mueller, Decatur, Ill., assignor to Mueller Co., Decatur, Ill., a corporation of Illinois Application June 11, 1945, Serial No. 598,759

5 Claims. (Cl. 251—93)

The present invention relates to meter stops.

The pipe line which connects a gas main to a residence ordinarily has a gas meter connected therein, and it is customary to also place a meter stop in this line on the inlet side of the meter. The purpose of the stop is to enable the flow of gas to the meter to be cut off, but because the flow is seldom cut off except when a change of occupancy occurs, a meter stop may not be operated for a great number of years.

Because such stops are only actuated at long intervals, the plug of the stop may become seized. For that reason, the smaller end of the plug is arranged to project from the casing so that it may be struck with a hammer to unseat it. Also, such stops are usually provided with means to lubricate the seating surface. If the plug is seized, tapping its smaller end will usually release it and if the seating surface is then supplied with lubricant, the plug readily can be rotated.

Lubricant is usually supplied to such a stop through a lubricant cap which closes a lubricant chamber at the larger end of the stop. In the prior stops, when this cap was removed for the purpose of inspection or for replenishing the lubricant, the plug could fall from the stop and be marred. Also, a temporary but serious loss of gas could occur. In other words, the prior meter stops included no means to hold the plug firmly seated so as to provide a thorough seal when the lubricant cap was removed.

An object of the present invention is to provide means in a meter stop which will secure the plug against falling from the stop when the lubricant cap is removed.

Another object of the invention is to provide means which can be used to hold the plug in sealed position at all times.

The provision of means to hold the plug seated at all times, and regardless of the lubricant pressure, is desirable because over a period of years the lubricant in the lubricant chamber may move into the flow line and gas may leak past the smaller end of the plug.

Another object of the invention is to provide a means which can normally hold the plug in tightly seated position but which is readily operable from the exterior of the stop to enable the plug to be tapped and unseated by a hammer blow.

Prior meter stops have included a spring positioned between the larger end of the plug and the lubricant cap. A spring positioned in that manner had the disadvantage of causing the plug to be even more firmly seated when the operator was threading the cap inwardly to force lubricant to the seating surfaces between the plug and casing.

A further object of the invention is to provide a means to secure the plug in the casing and which is not affected by operation of the lubricant cap.

Other objects and advantages of the invention will be apparent from the following specification and attached drawings, wherein:

Figure 1 is a central vertical sectional view of a stop of the present invention, and Figures 2, 3 and 4 are fragmentary central sectional views through three modified forms of stops, and Figure 5 is a transverse section on the line 5—5 of Figure 1.

Referring to Figure 1, the stop illustrated in this figure is generally designated by the numeral 10 and comprises a casing 11 including a flow passageway 12 and a tapered seat 13 extending transversely to the flow passageway. The smaller end of the seat 13 opens to the exterior of the casing and its larger end opens to a lubricant chamber 14 formed by an annular flange-like extension 15 on the casing 11. The larger end of the seating surface 13 is defined by a shoulder 16.

The seat 13 includes a circumferential lubricant groove 17 positioned between the smaller end of the seat and the ports of the flow passageway 12. Four longitudinally extending grooves 18 are equi-distantly spaced about the seating surface 13, two of these grooves being provided between each mouth of the flow passageway. The grooves 18 extend from the circumferential groove 17 to the shoulder 16 of the lubricant chamber.

A tapered plug 20 including an operating shank 21 is positioned in the seat 13, the plug including a flow port 22. A circumferentially extending groove 23 is formed in the plug 20 between the smaller end of the plug and the flow port. As illustrated in Figure 1, the circumferential groove 23 is opposite the circumferential groove 17 of the casing when the plug is in seated position in the casing.

The plug 20 is provided with a central boss 24 at its larger end, the boss having sufficient length axially of the plug that it will extend beyond the shoulder 16 when the plug is in its innermost seated position. The boss 24 has an anti-friction washer 25, preferably of metal, secured thereto, which washer is adapted to bear upon the central portion of a plug securing element generally designated by the numeral 26. The element 26 includes a disc portion 27 provided with threads on its periphery which will engage threads on the side wall of the lubricant chamber 14. If desired, washer 25 may be secured to the disc 27. The disc 27 has apertures 28 therein to permit free passage of lubricant through the disc and a central stem 29 extends outwardly from the disc portion and engages a threaded aperture 30 in the lubricant cap 31. Lubricant cap 31 is also threaded in the lubricant chamber and forms part of the casing.

A lock nut 32 may be provided on the stem 29 to engage the outer surface of the lubricant cap 31. The lubricant cap includes a squared portion 33 adapted to be engaged by a wrench and the outer end of the stem 29 may be slotted as indicated at 34 to permit the plug securing means 26 to be adjusted by means of a screw driver.

In the use of the stop of Figure 1, the lubricant chamber 14 may be filled with lubricant after removal of cap 31. During this operation the plug securing means 26 will prevent the plug from falling from the casing. When the cap is again threaded into the lubricant chamber, first by engaging the threads on the stem 29 and then by engaging threads in the lubricant chamber 14, the grease can be placed under pressure. As a result, lubricant will be forced into the grooves 18, 17 and 23 and the plug will be urged to a tightly seated position. The plug securing element 26 may then be threaded into sufficiently tight engagement with the anti-friction element 25 to hold the plug seated and sealed even though lubricant may, in the course of time, be lost to the flow line. Such loss can occur over a long period in which a meter stop is left unoperated and uninspected.

If the stop is to be operated after a number of years and the operator finds the plug seized, he may thread the securing means 26 slightly outwardly and then tap the plug to unseize it. Either before or after the tapping operation he may rotate the cap 31 inwardly to force more lubricant into the grooves. In any event, after the plug has been tapped and rotated to the desired position, the plug securing means 26 may be threaded inwardly to hold the plug firmly seated and sealed and the operator can then remove the cap 31 to inspect the grease in the lubricant chamber or replenish the supply of grease.

If the plug is not seized, the anti-friction element 25 will enable it to be readily rotated with respect to the holding means 26. In any event, the anti-friction element 25 will normally enable the plug to be rotated without also rotating the securing means 26 through frictional contact. However, the provision of the lock nut 32 will normally prevent the securing means 26 from being rotated with the plug.

Referring to Figure 2, the stop generally designated by the numeral 40 in this figure is identical with that disclosed in Figure 1 except that no lock nut is provided on the stem 29a of the plug securing element 26a.

Figure 2 also shows an anti-friction element 25a positioned between the plug boss 24a and the central portion of the disc 27a. It will be understood that this anti-friction disc may be secured either to the plug securing means 26a or to the boss on the plug.

The stop 50 illustrated in Figure 3 is identical with that disclosed in Figure 1 except that the anti-friction element 25b includes an annular flange 51 which surrounds the boss 24b of the plug.

Figure 4 discloses a stop 60 which is identical with that described in connection with Figure 1 except for the following: The plug 20c of Figure 4 includes a socket 61 in the boss 24c and a hardened steel ball 62 is positioned in the socket to bear on the central portion of the plug securing means 26c.

The structure of Figure 4 is very readily manufactured because the socket 61 can be formed in the plug by a common and simple center drilling operation, and it is not necessary to carefully machine the surfaces of the boss 24c and securing element 26c which will oppose each other. That is, because the ball will extend from the socket a sufficient distance to prevent any surface of the boss from contacting with the securing means, it is not necessary to carefully machine such surfaces.

It will be observed that all forms of the invention disclosed herein involve arrangements whereby a plug may be held or secured in the casing regardless of removal of the lubricant cap and that the lubricant cap and plug securing means can be operated entirely independently of each other. Also, the securing means can be relied upon to hold the plug in a tightly seated and sealed position in the event of loss of lubricant. Nevertheless, the securing means can be readily backed away from the plug to permit it to be unseized by tapping its smaller end.

The terminology used in the specification is for the purpose of description and not of limitation, the scope of the invention being indicated in the claims.

I claim:

1. In a valve, a casing including a flow passageway and a tapered seat extending transversely of the flow passageway, a tapered plug including a flow port positioned in said seat, a threaded bore extending axially from the larger end of the casing seat to the adjacent exterior of the casing and providing a lubricant chamber, lubricant grooves in the seating surface communicating with the lubricant chamber, a cap threaded in the outer end of the threaded bore and adapted to be operated to place the lubricant under pressure, plug securing means threaded in the inner portion of the bore and engaging the larger end of the plug, said cap having a central bore therethrough, and an operating stem for the plug securing means threaded in the cap bore and extending therethrough to the exterior of the cap.

2. A valve of the character defined in claim 1 wherein the plug securing means comprises an apertured disc element.

3. A valve of the character defined in claim 1 wherein a flat anti-friction element is interposed between the plug and said plug securing means.

4. A valve of the character defined in claim 1 wherein an anti-friction ball is interposed between the plug and said plug securing means.

5. A valve of the character defined in claim 1 wherein the plug includes a central boss at its larger end, which boss is socketed to receive an anti-friction ball and the anti-friction ball bears upon said plug securing means.

LUCIEN W. MUELLER.

REFERENCES CITED

The following references are of record in the file of this patent:

UNITED STATES PATENTS

| Number | Name | Date |
| --- | --- | --- |
| 760,546 | Moreland | May 4, 1904 |
| 1,365,116 | Martin | Jan. 11, 1921 |
| 2,286,689 | Scherer | June 16, 1942 |